Sept. 16, 1930.  C. SCHENCK  1,775,832

CLUTCH

Filed Oct. 25, 1928   3 Sheets-Sheet 1

Inventor
Charles Schenck
By R. S. A. Dougherty.
Attorney

Sept. 16, 1930.　　　C. SCHENCK　　　1,775,832
CLUTCH
Filed Oct. 25, 1928　　　3 Sheets-Sheet 2

Inventor
Charles Schenck.
By R. S. A. Dougherty
Attorney

Sept. 16, 1930.　　　C. SCHENCK　　　1,775,832
CLUTCH
Filed Oct. 25, 1928　　　3 Sheets-Sheet 3

INVENTOR
Charles Schenck.
BY
R. S. A. Dougherty
ATTORNEY

Patented Sept. 16, 1930

1,775,832

UNITED STATES PATENT OFFICE

CHARLES SCHENCK, OF BETHLEHEM, PENNSYLVANIA, ASSIGNOR TO BETHLEHEM STEEL COMPANY

CLUTCH

Application filed October 25, 1928. Serial No. 314,863.

My invention relates to clutches and particularly to the type which is automatic in operation.

In connection with the problem of transmitting power from an auxiliary engine or motor, for example, the application of auxiliary engines to tender trucks of locomotives, it has heretofore been the practice of using a train of gears to secure operative relations between the auxiliary engine and the axle of the tender truck which could be entrained and disentrained by the employment of an idler gear which could be moved into and out of mesh with a gear mounted on one of the axles of the tender truck.

The object of my invention is to provide an apparatus of a character in which the gears are constantly in mesh and which is adapted to establish a driving connection between an auxiliary engine or a motor and a driven shaft solely by the turning over of said engine or motor.

Another object of my invention is the provision of novel and simple means adapted to coact with a railway vehicle propulsion unit to automatically cause the latter to be operatively connected to a driven axle of such vehicle during the initial operation of said unit.

Another object of my invention is to provide a driving connection between an auxiliary propulsion unit and a driven axle of a railway vehicle which is adapted to be rendered effective by the turning over of said unit in a predetermined direction and which is rendered ineffective when the speed of the driven axle exceeds the relative speed of the propulsion unit, or when the direction of the driven axle is reversed.

Broadly stated my invention comprises a driving shaft to which is fixedly mounted a driving gear, a driven shaft or axle having a driven gear loosely mounted thereon and constantly meshing with the driving gear, said driven shaft being capable of rotating in either direction independently of the driven gear, a clutch for operatively connecting the driven gear to the driven shaft when the driving shaft is rotated in a predetermined direction at a speed in excess of the relative speed of the driven shaft, the clutch being so arranged that the driven shaft is incapable of driving the driven gear when the speed of the driven shaft exceeds the relative speed of the driving gear; and friction means for preventing the rotation of the driven gear in a direction opposite to its predetermined direction upon reversal of the driven shaft.

Other novel features will be more fully understood from the following description and the claims taken with the drawings in which:—

Figure 1:
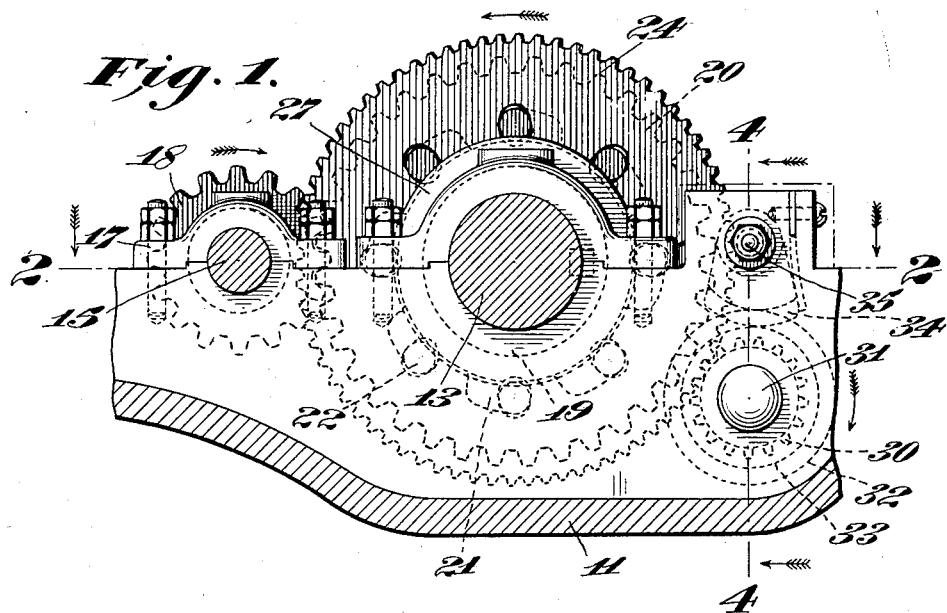
Fig. 1 is a side elevation view of my invention.
Figure 2:
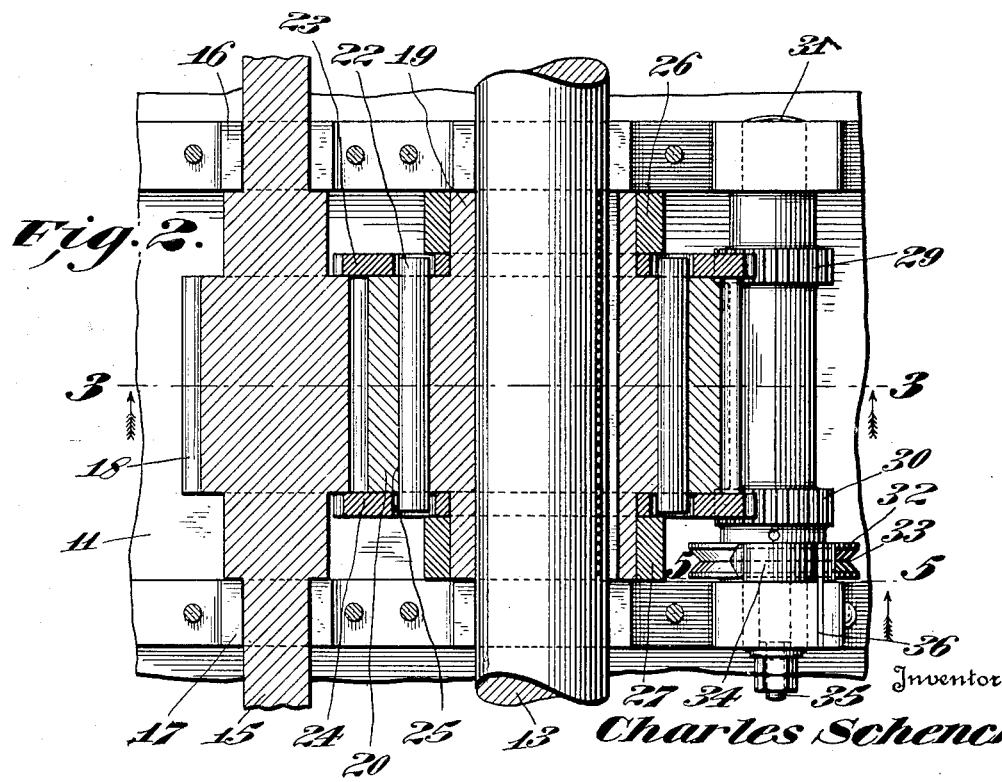
Fig. 2 is a sectional view taken on line 2—2 of Fig. 1.
Figure 3:
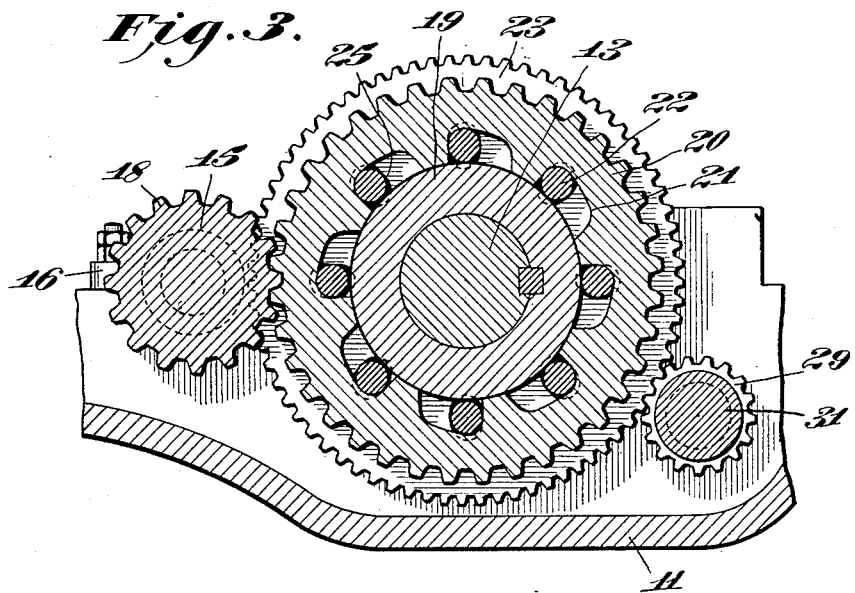
Fig. 3 is a sectional view taken on line 3—3 of Fig. 2.
Figure 4:
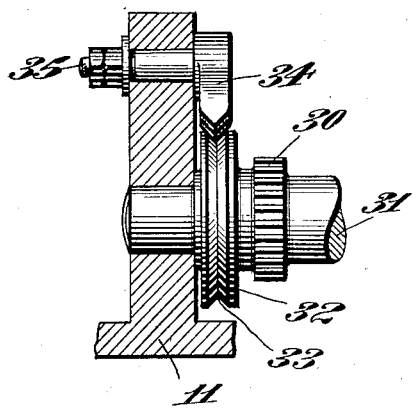
Fig. 4 is a sectional view taken on line 4—4 of Fig. 1.
Figure 5:
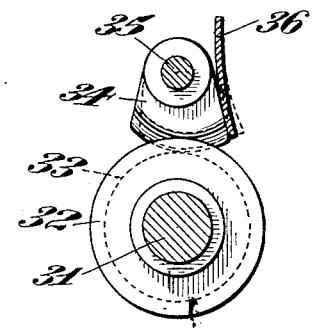
Fig. 5 is a sectional view taken on line 5—5 of Fig. 2.

Referring to the drawings more in detail 10 designates generally an auxiliary locomotive propulsion unit, the frame 11 of which is mounted on the load bearing axles 12 and 13 of a railway vehicle, preferably the locomotive tender. The engine 14 is supplied with steam from the locomotive boiler and drives the crank shaft 15 which is mounted in suitable bearings 16 and 17 upon the frame 11.

The aforementioned crank shaft 15 is provided with a driving toothed gear 18 and the axle 13 is provided with a hub 19 keyed thereto and upon which is loosely mounted a driven toothed gear 20, the driven and driving gears being in constant mesh with each other.

The gear 20 is provided with inclined recesses 21 within which are mounted clutch rollers 22, these recesses being so formed that when the rollers 22 are in the position shown in the drawing they will float freely within said recesses and the axle 13 will be able to rotate freely within the gears 23 and 24. When the gear 20 is rotated in the direction of the arrow, the clutch rollers 22 will be moved into the inclined portion of the recesses 21 until a driving connection is established between the gear 20 and the hub 19.

Loosely mounted on the hub 19, on either side of the gear 20, are gears 23 and 24. These gears are provided with apertures 25 within which the rollers 22 are rotatively mounted. Spacing rings 26 and 27 are loosely mounted on the hub 19 and serve to retain the gears 20, 23 and 24 in their proper position and also serve to retain the rollers 22 within the apertures 25 of gears 23 and 24.

Meshing with the gears 23 and 24 are gears 29 and 30, respectively, which are fixedly mounted on the shaft 31. A friction wheel 32 is also fixedly mounted on shaft 31. The friction wheel 32 is provided with an annular peripheral groove 33, which is V-shaped in section and which is capable of being engaged by the V-shaped, eccentric, friction dog 34. This dog is pivotally mounted upon the shaft 35 and is retained in contact with the friction wheel by the spring 36. The eccentric dog 34 is so mounted that it will allow the friction wheel 32 to rotate in the direction indicated by the arrow, but when the friction wheel is rotated in the opposite direction the eccentric dog 34 will be rocked about its pivot until the wedging effect between the wheel 32 and the dog 34 is sufficient to prevent the wheel 32 from further rotation. As the gears 29 and 30 are mounted in fixed relation on the same shaft as the friction wheel 32, and the gears 23 and 24 are in mesh with gears 29 and 30, respectively, it will be impossible to drive the latter gears in but one direction.

Figure 6:
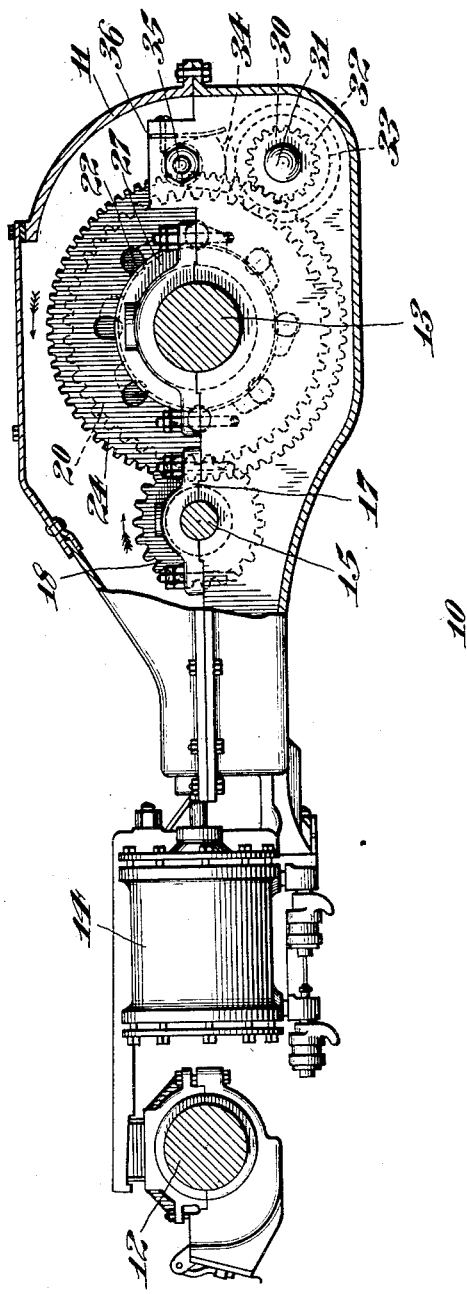
Fig. 6 is a longitudinal cross-section through an auxiliary locomotive embodying my invention.

In operation, assuming that the mechanism is in the position shown in Figs. 1 and 6 of the drawings and the driving gear 18 is rotated in the direction indicated by the arrow, the driven gear 20 will initially rotate around the hub 19 until the clutch rollers 22 enter the narrow portion of the inclined recesses 21 sufficiently to establish a clutching effect between the gear 20 and the hub 19 which is keyed to the axle 13, thus establishing a driving connection between the driving gear 18 and the driven axle 13.

This driving connection is maintained as long as power is supplied to the axle 13 from the driving gear 18. However, should the power to the auxiliary locomotive be shut off or should the speed of the axle 13 exceed the relative speed of the gear 18, the rollers 22 will be returned to the enlarged portion of the recesses 21 of the gear 20 and therefore will break the driving connection between the gear 20 and the axle 13.

When the axle 13 is turned in the reverse direction, due to the reversal of the main locomotive, the hub 19, which is keyed to the axle 13, will tend to move the rollers 22 into engagement with the inclined portion of the recesses 21, but as these rollers are pivoted in the gears 23 and 24 which are in mesh with gears 29 and 30 respectively and as these gears are held against rotation in a reverse direction due to the friction wheel 32 being held against rotation by the dog 34 the rollers 22 will be drawn into the enlarged portion of the recesses 21 and therefore the axle 13 will be able to rotate within the gear 20 without establishing a driving connection therewith.

It will be seen from the foregoing that I have devised a novel and simple clutch arrangement for automatically obtaining a driving connection between an auxiliary propulsion unit and an axle normally disconnected therefrom and that I have also devised controlling mechanism for automatically releasing the clutch in order to prevent the axle from driving the propulsion unit.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention, what what I claim as new and desire to secure by Letters Patent is:

1. In an auxiliary propulsion unit, the combination of a driving gear, a driven gear constantly meshing with said driving gear, an axle, a roller clutch for operatively connecting said driven gear with said axle and automatic controlling means, comprising back gearing for releasing said clutch.

2. In an auxiliary propulsion unit, the combination of an engine having a drive shaft, a driving gear fixedly mounted on said shaft, an axle, a driven gear loosely mounted on said axle, a roller clutch for operatively connecting said driven gear to said axle to rotate said axle in a predetermined direction and means for rendering said clutch ineffective upon the rotation of said axle in a reversed direction.

3. In combination with an auxiliary driving mechanism a normally idle shaft, a driving gear fixedly mounted on said shaft, an axle, a driven gear loosely mounted on said axle and constantly meshing with said driving gear, said driven gear having inclined recesses theerin, clutch rollers in said recesses adapted to connect the driven gear to the aforementioned axle, and controlling means for the clutch rollers adapted to automatically disconnect the driven gear from the axle upon the attempt of the axle to drive the driven gear in either direction.

4. In an auxiliary locomotive propulsion unit, the combination of a drive shaft, a driving gear operatively connected to said shaft, an axle, a driven gear loosely mounted on said axle and constantly meshing with said driving gear, a roller clutch for operatively connecting the driven gear to said axle to drive the axle in a predetermined direction and means for automatically rendering said clutch ineffective when the speed of the axle exceeds the speed of the driven gear or when the axle is rotated in a reversed direction.

5. In an auxiliary propulsion unit, the combination of a driving gear, a driven gear constantly meshing with said driving gear, an axle, a clutch for operatively connecting said driven gear with said axle, said clutch comprising rollers extending through inclined recesses in the driven gear and terminating in gearing at either side of the driven gear and means operatively connected with said gearing for rendering said clutch ineffective.

6. In an auxiliary propulsion unit, the combination of a driving gear, a driven gear constantly meshing with said driving gear, an axle, a clutch for operatively connecting said driven gear with said axle, said clutch comprising rollers extending through inclined recesses in the driven gear and terminating in gearing at either side of the driven gear and controlling means for said clutch comprising a shaft, a pair of gears mounted on said shaft and constantly meshing with the aforementioned gearing, a friction wheel and an eccentric dog engaging said wheel.

7. In an auxiliary propulsion unit, a driving shaft, a driving gear fixedly mounted on said shaft, a driven shaft, a driven gear loosely mounted thereon and constantly meshing with the driving gear, said driven shaft being capable of rotating in either direction independently of the driven gear, a clutch for operatively connecting the driven gear to the driven shaft when the driving shaft is rotated in a predetermined direction and means for releasing the clutch upon the attempt of the driven shaft to drive the driven gear.

In testimony whereof I hereunto affix my signature.

CHARLES SCHENCK.